(12) United States Patent
Sweetser et al.

(10) Patent No.: US 9,494,415 B2
(45) Date of Patent: Nov. 15, 2016

(54) OBJECT POSITION DETERMINATION

(71) Applicant: INTEL CORPORATION, Santa Clara, CA (US)

(72) Inventors: John N. Sweetser, San Jose, CA (US);
Anders Grunnet-Jepsen, San Jose, CA (US);
(Continued)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 14/125,907

(22) PCT Filed: Nov. 7, 2013

(86) PCT No.: PCT/US2013/068892
§ 371 (c)(1),
(2) Date: Dec. 12, 2013

(87) PCT Pub. No.: WO2015/069252
PCT Pub. Date: May 14, 2015

(65) Prior Publication Data
US 2015/0131852 A1 May 14, 2015

(51) Int. Cl.
*G06K 9/32* (2006.01)
*G01B 11/14* (2006.01)
(Continued)

(52) U.S. Cl.
CPC ............... *G01B 11/14* (2013.01); *G01V 8/20* (2013.01); *G06F 1/169* (2013.01); *G06F 1/1686* (2013.01);
(Continued)

(58) Field of Classification Search
None
See application file for complete search history.

(56) References Cited

U.S. PATENT DOCUMENTS

| 8,515,128 B1 * | 8/2013 | Hildreth | G06F 3/017 345/156 |
| 2005/0282561 A1 | 12/2005 | Wu | |

(Continued)

FOREIGN PATENT DOCUMENTS

WO    WO 2008-068612 A1    6/2008

OTHER PUBLICATIONS

International Search Report and Written Opinion mailed Aug. 28, 2014 for International Application No. PCT/US2013/068892, 13 pages.

(Continued)

*Primary Examiner* — Chan Park
*Assistant Examiner* — Mai Tran
(74) *Attorney, Agent, or Firm* — Schwabe, Williamson & Wyatt, P.C.

(57) ABSTRACT

In embodiments, apparatuses, methods and storage media for human-computer interaction are described. In embodiments, an apparatus may include one or more light sources and a camera. Through capture of images by the camera, the computing device may detect positions of objects of a user, within a three-dimensional (3-D) interaction region within which to track positions of the objects of the user. The apparatus may utilize multiple light sources, which may be disposed at different distances to the display and may illuminate the objects in a direction other than the image capture direction. The apparatus may selectively illuminate individual light sources to facilitate detection of the objects in the direction toward the display. The camera may also capture images in synchronization with the selective illumination. Other embodiments may be described and claimed.

10 Claims, 7 Drawing Sheets

(72) Inventors: Paul Winer, Santa Cruz, CA (US);
Leonid M. Keselman, Santa Clara, CA (US); Steven S. Bateman, Portland, OR (US); Chris Rojas, San Jose, CA (US); Akihiro Takagi, San Mateo, CA (US); Chandrika Jayant, San Francisco, CA (US)

(51) Int. Cl.
| | |
|---|---|
| *G01V 8/20* | (2006.01) |
| *G06F 3/00* | (2006.01) |
| *G06F 3/01* | (2006.01) |
| *G06F 1/16* | (2006.01) |
| *G06F 3/03* | (2006.01) |
| *G06F 3/0346* | (2013.01) |

(52) U.S. Cl.
CPC ............... *G06F 3/005* (2013.01); *G06F 3/017* (2013.01); *G06F 3/0304* (2013.01); *G06F 3/0346* (2013.01)

(56) References Cited

U.S. PATENT DOCUMENTS

| | | | |
|---|---|---|---|
| 2006/0044259 A1* | 3/2006 | Hotelling | G06F 1/1616 345/156 |
| 2007/0023499 A1 | 2/2007 | Wurzburg et al. | |
| 2007/0204055 A1 | 8/2007 | Oishi et al. | |
| 2008/0088587 A1 | 4/2008 | Pryor | |
| 2008/0122799 A1* | 5/2008 | Pryor | G06F 3/0312 345/173 |
| 2008/0211779 A1* | 9/2008 | Pryor | G01C 21/3664 345/173 |
| 2008/0231835 A1* | 9/2008 | Iizuka | G01S 17/08 356/72 |
| 2008/0297505 A1 | 12/2008 | Elsberg et al. | |
| 2012/0113140 A1 | 5/2012 | Hilliges et al. | |
| 2012/0182215 A1* | 7/2012 | Han | G06F 3/017 345/156 |
| 2012/0246377 A1 | 9/2012 | Bhesania et al. | |
| 2013/0088462 A1 | 4/2013 | So et al. | |
| 2013/0262722 A1 | 10/2013 | Togano et al. | |
| 2013/0321643 A1* | 12/2013 | Fujinawa | H04N 7/183 348/169 |
| 2014/0028861 A1* | 1/2014 | Holz | H04N 5/23277 348/208.4 |

OTHER PUBLICATIONS

International Search Report and Written Opinion mailed Aug. 14, 2014 for International Application No. PCT/US2013/071057, 10 pages.

International Preliminary Report on Patentability mailed May 12, 2016 for International No. PCT/US2013/067323, 10 pages.

International Preliminary Report on Patentability mailed May 19, 2016 for International No. PCT/US2013/068892, 9 pages.

\* cited by examiner

Fig. 8

OBJECT POSITION DETERMINATION

CROSS REFERENCE TO RELATED APPLICATIONS

The present application is a national phase entry under 35 U.S.C. §371 of International Application No. PCT/US2013/068892, filed Nov. 7, 2013, entitled "OBJECT POSITION DETERMINATION", which designated, among the various States, the United States of America. The Specification of the PCT/US2013/068892 Application is hereby incorporated by reference.

TECHNICAL FIELD

The present disclosure relates to the field of data processing, in particular, to apparatuses, methods and systems associated with human-computer interaction.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Human computer interactions have traditionally been relegated to user control via physical interaction of a user with one or more input devices, such as a mouse, a keyboard, a track ball, a touch pad, and so forth. The mouse, et al. have essentially become the sine qua non of human computer interaction. While a user's interaction with a mouse et al. may have become somewhat ingrained with users, the interaction has never been natural or intuitive.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Methods, computer-readable storage media, and apparatuses for human-computer interaction are described. In embodiments, an apparatus may include one or more light sources and a camera. Through capture of images by the camera, such as illuminated by the one or more light sources, the computing device may detect positions of objects of a user (e.g., fingertips or other pointing devices, such as styli), within a three-dimensional (3-D) interaction region within which to track individual objects of the user. Through tracking of individual objects, embodiments, may facilitate tracking of movements of the objects as well. An example of a 3-D region may include a 3-D region in front of a display screen, which may be included in the apparatus. The apparatus may also include a position determination module coupled with the one or more light sources and the camera and configured to determine positions of the objects, based on one or more images captured by the camera. The camera may be disposed in the apparatus such that it captures images in a direction normal to a plane defined by the display, thus capturing images that may be optimally sized relative to the location and orientation of the display.

In order to support detection of the objects in a direction toward the display screen (e.g. in the direction of the image capture), the apparatus may utilize multiple light sources. These multiple light sources may be disposed in the apparatus at different distances to the display and may be configured to illuminate the objects in a direction other than the image capture direction. Additionally the apparatus may include an illumination determination module configured to selectively illuminate individual light sources to facilitate detection of the objects in the direction toward the screen. The camera may further be configured to capture images in synchronization with the selective illumination, such that captured images may include images of the objects illuminated by only one of the multiple light sources. Through comparison of these synchronized images, positions of the objects may be determined in multiple axes. For ease of understanding, reference will simply be made to determination of positions of objects of a user, as determination of positions of fingertips of the user. However, as described herein, embodiments are not so limited. Embodiments of the present disclosure may determine position of other body parts of users, such as, for example, fingers and hands, as well as of other objects, such as pens and styli.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1A:
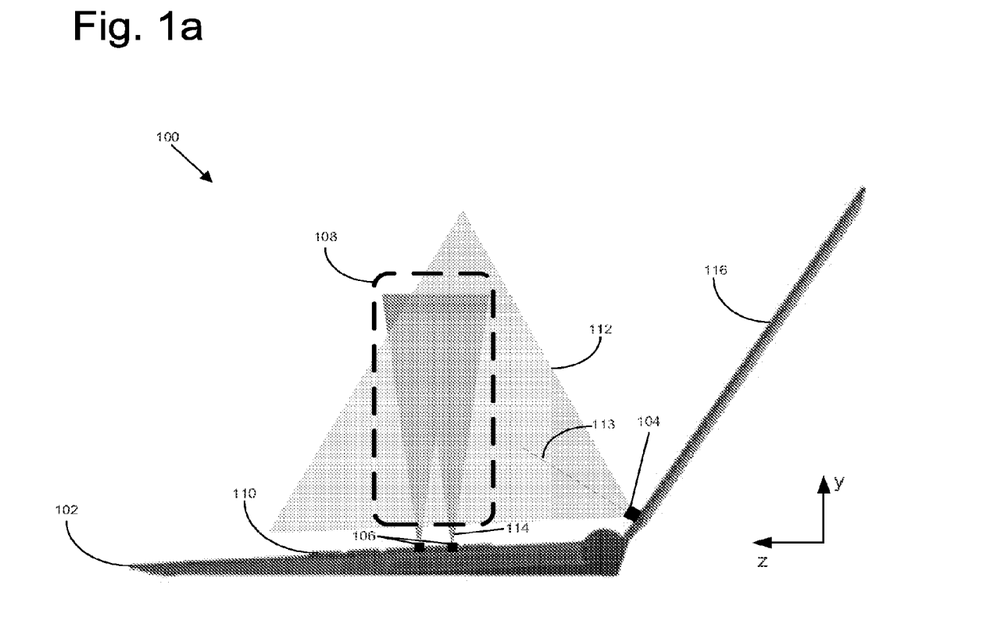
FIGS. 1a and 1b are diagrams illustrating examples of a computing device for supporting human computer interaction, in accordance with various embodiments.
Figure 1B:
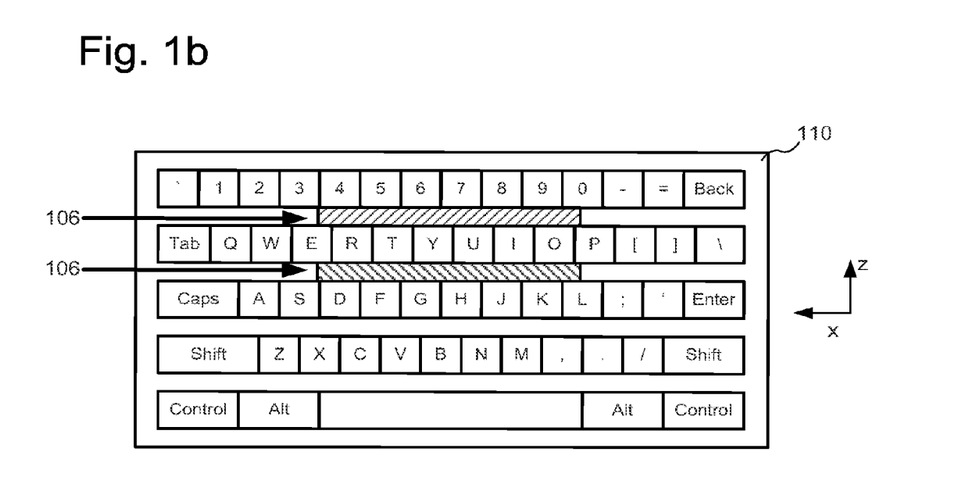

Referring now to FIGS. 1a and 1b, examples of a computing environment 100 for supporting human computer interaction is illustrated in accordance with various embodiments. As illustrated in FIG. 1a, computing environment 100 may include a computing device 102. In various embodiments, computing device 102 may include a portable computing device, such as a laptop computer or tablet, or other computing devices, such as a desktop computer. In various embodiments, computing device 102 may include a display 116 as well as a keyboard 110.

Computing device 102 may include one or more cameras, such as camera 104. In various embodiments, the camera 104 may be configured to capture images inside an image capture angle 112. In embodiments, the camera 104 may be situated in the computing device 102 such that the image capture angle 112 is centered around an image capture direction 113 that is substantially normal to the plane defined by the display 116. In some embodiments, the camera 104 may be situated proximate to the display 116. For example, in some embodiments, the camera 104 may be situated below the display 116 (e.g., between the bottom of the display 116 and keyboard 110. By situating the camera near to the display 104, the camera 104 may be better configured to capture a more robust image capture angle relative to the display than with other dispositions of the camera 104. In various embodiments, however, since the angle of the display 116 with respect to the keyboard 110 (or other portions of the computing device 102) may not be fixed, the camera 110 may be configured such that its vertical field of view is large enough to capture images of fingertips or other objects over a range of screen angles. In some embodiments, the camera 104 may be adjustable in one or more orientations or positions, such as to account for varying operating conditions, such as different user preferences or different angles of the display 116.

Computing device 102 may also include one or more light sources 106; these light sources 106 may be utilized by the computing device to illuminate a fingertip or other object (such as a stylus) such that images of the fingertips may be better captured by the camera 104. In various embodiments, these light sources 106 may include various structures for emitting light, such as, for example, one or more light-emitting diodes (LEDs). In various embodiments, the light sources 106 may be configured to emit non-visible light for illumination. For example, light from a near infra-red portion of the electromagnetic spectrum may be emitted by the one or more light sources 106. In some embodiments, the light sources 106 may be configured to emit light in a range between ~800 nm and ~950 nm. This range is beyond the visible portion of the electromagnetic spectrum as well as where higher-power LEDs may be commercially available. In such embodiments, the camera 104 may be configured with a filter, such as a filter placed in front of a sensor for the camera 104. The filter may substantially block wavelengths of light except those within the illumination spectrum provided by the one or more light sources 106. In embodiments, the use of a filter may reduce interfering background light in images captured by the camera 106; in this way, only images of those objects that are wished to be tracked, such as fingers, may be captured. In some embodiments, because some digital image sensors (such as, silicon complementary metal-oxide-semiconductor, or silicon CMOS) have an inherent spectral response that essentially cuts off for wavelengths above ~1000 nm, a long-pass filter may be used for background reduction. In other embodiments, a bandpass filter may be used in addition to or in lieu of the long-pass filter. In some embodiments other wavelength ranges in which a camera 104 may have sensitivity (typically, ~400 nm to ~1000 nm) may be used. For example, visible light (~400 nm to ~700 nm) may be useful as visual feedback to the user or as a guide during operation.

In addition to optical filtering, in various embodiments, other techniques may also be employed to reduce various sources of background signals. For example, the camera 104 may be configured to utilize reduced exposure times during image capture. Additionally, illumination provided by the one or more light sources 106 may be matched in duration and/or synchronized to the image capture exposure times, (such as by strobing or pulsing LEDs) to reduce sensitivity to non-illuminated objects. In some embodiments, a peak power of the one or more light sources 106 may be increased to compensate for a reduced exposure time. In some embodiments, the camera 104 may include an image sensor that includes a global (as opposed to rolling) shutter to facilitate variable exposure and/or strobing operation.

In embodiments, background reduction may also be enhanced by setting a threshold level for detection, wherein any sensor signals below the threshold will be omitted from a captured image. In various embodiments, use of such thresholds may be performed in hardware (such as prior to or during light detection) or software (after detection) level. In embodiments, hardware-based use of thresholds may be achieved using sensors with manual 'black level control' which may be dynamically adjusted. In addition to general background reduction, the dynamic threshold adjustment may be used, for example, to maintain a near constant image size as the user moves within the interaction region.

In embodiments, dynamic control of a detected region of pixels (i.e., 'windowing') is another technique that may be used to enhance performance. By reducing a number of pixels in the processed image to only those of interest, higher frame rates and/or reduced image processing can be achieved. CMOS-based image sensors may permit such windowing functions, which may be used when tracking simpler objects whose image is confined to one area of the sensor (e.g., tracking of a single finger).

Figures 2, 3:
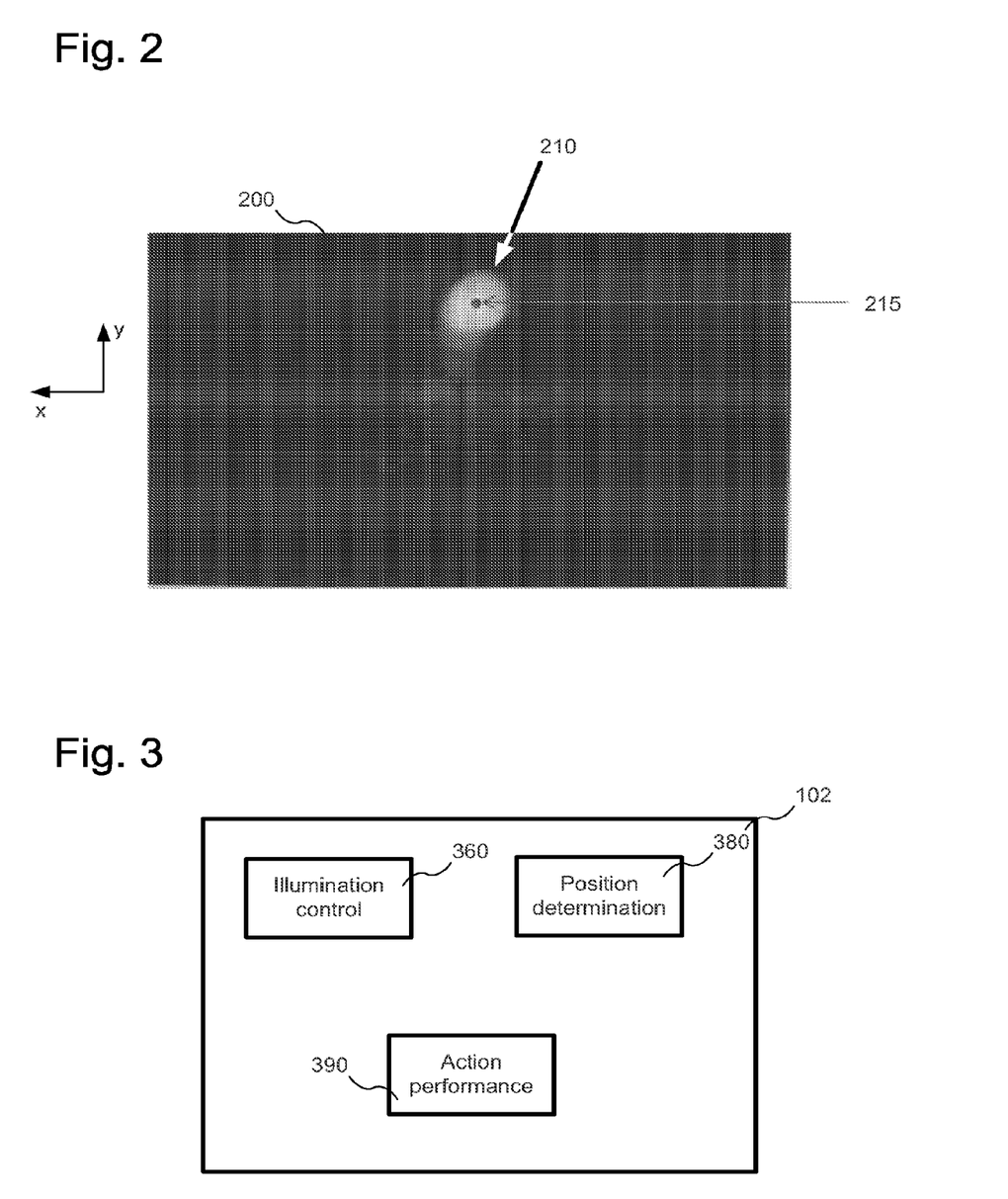
FIG. 2 is an example image captured by a device supporting human-computer interaction, in accordance with various embodiments.
FIG. 3 is a block diagram illustrating one or more components of a computing device supporting touch-free interaction, in accordance with various embodiments.

Referring now to FIG. 2, an example image 200 captured by the camera 104 is illustrated. It may be noted that the image is in a plane defined by the x- and y-axes and thus may be considered to capture one or more slices of the z-axis, as described herein. The image 200 may include one or more images of fingertips, such as fingertip image 210, which may be recognized by the computing device 102. Particular embodiments, of fingertip recognition are discussed below. In various embodiments, a center point 215 of the fingertip image 210 may be identified as used as a part of the fingertip position that may be determined by the computing device 102. Particular embodiments of fingertip position determination are also described below.

Returning to the examples of FIG. 1, in various embodiments, rather than using a single camera 104, multiple cameras 104 may be included in the computing device 102 in order to determine additional, or even redundant, information about object positions. For example, a two-camera arrangement may take on several configurations. In one embodiment, two cameras 104 may be placed adjacent to each other in a stereo vision configuration where the two cameras 104 are located next to each other. In various embodiments, this configuration may provide additional information, such more accurate depth (z-axis) determination. In another embodiment, a second camera may be placed at an angle (e.g., orthogonal) to the primary tracking camera (e.g., such that the second camera's image capture direction is parallel to an illumination direction from the light sources 106. In some embodiments, in addition to providing more location information about the tracked fingers, such arrangements may mitigate difficulty with occlusions associated with tracking multiple objects.

In embodiments, the one or more light sources 106 and the camera 104 may be complementarily disposed such that the combination may better enable determination of fingertip (and/or stylus) positions, as described herein. For example, as depicted here, the one or more light sources 106 may be configured within keyboard 110 such that light 114 emitted therefrom may project upward to intersect with image capture angle 112 of camera 104. In various embodiments, light emitted from below by the light sources 106 may be better disposed to reflect or scatter off various objects placed near the source for a portion of the emitted light may be detected by the tracking camera. An illumination zone is defined as the volume of space in which there is sufficient light available to reflect or scatter off an object, such as a finger, and be detected by the camera. The camera also has a characteristic zone, defined by its horizontal and vertical field of view (FOV), which defines the volume of space that it can detect. It is the overlap between the illumination zone and camera detection zone that defines the system's effective operating range, or 3D interaction region.

In various embodiments, the intersection of the image capture angle 112 of camera 104 and the light 114 emitted by the one or more light sources 106 may create a three-dimensional (3-D) interaction region 108 within which one or more positions for one or more fingertips of a user may be detected. In embodiments, the light sources 106 and/or camera 104 may be configured to maximize overlap of the image capture angle 112 and the light 114 and thus to create a larger 3-D interaction region 108. In various embodiments, this fingertip position determination may facilitate detection of finger and/or hand positions, and, through continuous tracking, thereby facilitate tracking finger and/or hand movements of the user in the 3-D interaction region 108. In some embodiments, while the camera 104 may be focused at or near the 3-D interaction region 108, in other embodiments, the camera 104 may be focused at a different dept. For example the camera 104 may be configured to operate in a 'defocused' condition where the camera 104 is configured to focus on objects either in front of or behind the 3-D interaction region 108. In such an arrangement, while captured images may be blurred compared with other focus distances, this configuration may aid with distance determination or discrimination or provide more robust operation.

In embodiments, the 3-D interaction region 108 may be situated above the keyboard 110 to better facilitate easier interaction by a user with the computing device 102. In some embodiments, the 3-D interaction region 108 may be located near the top of the computing device 102, centered above the keyboard and within 5 to 10 cm from the display 116 in order to provide this facility. The interaction region may be substantially matched to the range of a user's natural hand/finger movements. In embodiments, these movements may typically span a volume of several centimeters in each x, y, and z dimensions (e.g., 10×5×5 cm, 5×3×3 cm, etc.). However, in some embodiments, the light sources 106 may be located so as to place the 3-D interaction region 108 closer to the bottom of the keyboard 110, such as near a trackpad location (e.g., ~15-20 cm from the display 116). In other embodiments, the light sources 106 may be embedded in an external keyboard 100, separate from the computing device 102, or in a separate module. In some embodiments, when the 3-D interaction region is positioned farther from the camera 104, the camera 104 may be configured to utilize a narrower field of view, or additional optics (e.g., an adjustable zoom lens) may be included to adjust and optimize the camera 104's field of view.

In embodiments, the light sources 106 may be configured such that the illumination light is relatively spatially uniform over the x-z plane within the interaction region. In various embodiments, different approaches may be used to achieve desired uniformity. In some embodiments, the light sources 106 may include a 1- or 2-dimensional array of individual LEDs placed within or adjacent to the keyboard 110. In various embodiments, a number and spacing of the LEDs may depend on a variety of system factors such as, but not limited to: a total optical power emitted from each LED, LED emission angles (e.g., angular distribution of emitted light), a maximum height (y) of the 3-D interaction region 108 (e.g., how far above the illumination source the tracking is desired), a maximum distance (z) from the camera where the tracking occurs, and/or a sensitivity of the camera. In alternative embodiments, additional beam shaping optical elements may be utilized to distribute the available light. Such beam shaping optical elements may, in various embodiments, include lenses, mirrors, gratings, diffusers and other optical elements known to shape the spatial distribution of light.

In various embodiments, in order to reduce power expenditure by the one or more light sources 106, the computing device may be configured to utilize only portions of the light sources 106 that affect object illumination at any given time. For example, if a finger is tracked to a particular side of the 3-D interaction region 108, only light sources (or portions thereof) may be illuminated. This selective illumination may be performed, for example, when single objects that span a relatively small fraction of the 3-D interaction region 108 are being tracked.

Additionally, as illustrated in FIG. 1a, the one or more light sources 106 may be situated such that they are at various distances from the display 116 (e.g., along the z-axis). For example, as illustrated in FIG. 1b, in various embodiments, the one or more light sources 106, such as a linear array of IR emitting LEDs, may be situated between rows of the keyboard 110. In various embodiments, by utilizing multiple light sources 106 at different distances from the display 116, the computing device 102 may be configured to better facilitate determination of finger position in the z-axis. For example, in various embodiments, the computing device 102 may be configured to selectively control illumination of the individual light sources 106. These selective illuminations may, in turn be synchronized with image capture by the camera 104. By capturing fingertip images at various depths, the computing device 102 may be facilitated in determining more precise positions in the z-axis. Such determination may be used for detection of gestures. For example, in one embodiment fingers (or other objects) illuminated by a light source 106 that is farther away from the camera 104 may be interpreted as presenting a "hover" or "mouse move" indication to the computing device 102. In contrast, fingers (or other objects) illuminated by a closer light source may be interpreted as presenting "touch input" or "mouse down" input to the computing device 102.

In embodiments, a span along an x-axis of the LEDs may be approximately matched to a corresponding desired span for the 3-D interaction region to facilitate relatively uniform illumination across the 3-D interaction region. In some embodiments, this span may be 5-15 cm. In embodiments, the LED array may be positioned near the center of the z-axis of the 3-D interaction region 108, which, in various embodiments, may be at the top, near the center, or below the bottom of the keyboard 110. In various embodiments, the light sources 106 may be covered by a cover that substantially passes the light emitted from the light sources 106 but blocks light visible to the human eye, such that the light sources 106 are not distracting to a user using the keyboard 110.

However, in some embodiments, the computing device 102 may be configured to define a 3-D interaction region that is narrower in the z-axis direction. In such cases, interactions with the computing device 102 may exhibit a more 2-dimensional (x-y) quality and may behave essentially like a 'remote touchscreen', with less distance sensitivity. Such arrangements may provide a more confined operating space for the user but may aid with background discrimination and permit reduced power consumption. In some embodiments, in order to produce illumination that is asymmetric between the x-axis and z-axis, different techniques may be used. For example, small emission angle (e.g., <50 degree) LEDs may be used and placed relatively close together along the x-axis to ensure relatively uniform illumination in x. In alternative embodiments, wider angle LEDs may be used, spaced farther apart along the x-axis, but with one or more separate cylindrical optical elements placed above the LED array to partially collimate emitted light in the z-dimension. Custom asymmetric LED sources may also be used for this purpose in other embodiments, and other optical diffusing methods and devices may also be used to improve spatial uniformity of the illumination. Additionally, in various embodiments, aside from linear (x-axis) or rectangular (x- and z-axes) illumination sources, the computing device 102 may utilize other geometries. For example, in one embodiment, a predominantly linear light source, with very little z-axis extent, may have one section in which the illumination extends further along the z-axis. In some embodiments, this extended section, may be used as a portion of the 3-D interaction region 108 that is reserved for specific functions such as zooming or selection/clicking. In embodiments, the extended section may be implemented by using wider emission angle LEDs or by physically extending the sources in the z-dimension or by other techniques. In various embodiments, light 114 provided by the light sources 106 create illumination zones that may include T shapes, L shapes, cross shapes, or some other geometry, depending on intended usage.

In embodiments, the light 114 emitted by the one or more light sources 106 may be configured to accentuate, or highlight, fingertip positions within the 3-D interaction region and therefore may facilitate determination of fingertip positions by computing device 102. Such positions may be determined with reference to the labeled x, y, z axes. In various embodiments, one or more fingertip positions may be mapped to a position on the display 116 on which a cursor or other screen icon may be placed. In embodiments, computing device 102 may be configured to correlate actions of the user, such as positions of the user's fingertips, with a corresponding location of a positional indicator, such as a cursor, on the display 116. In embodiments, mouse-like cursor control and navigation of displayed content may be facilitated. In such an embodiment, a user may be able to move a cursor rendered on display 116 to a desired location near a desired object on display 116 and to perform a gesture which may cause computing device 102 to carry out a user control action on the object. In some embodiments, multiple fingers (or other objects) may be tracked. Multiple finger tracking may be used for functions such as "pinch-to-zoom" or up-down/left-right scrolling common in trackpad and touchscreen interfaces. Particular position determination techniques may be described below.

In embodiments, and as described above, a position of a non-finger object, such as a pen or stylus, may be determined. For example, in some embodiments, a user may hold a pen or stylus inside the 3-D interaction region and manipulate the pen or stylus in free space while a tip of the pen or stylus is tracked and its location mapped to a corresponding location on the display 116. In some embodiments, the tip of the pen or stylus may include material that is highly reflective (or absorptive) of the light emitted by the one or more light sources 106 in order to enhance discrimination with respect to background images. In other embodiments, actively emitting markers (e.g., IR LEDs) may be attached to the pen or stylus to aid in image capture. In various embodiments, the computing device 102 may additionally be configured to detect, in addition to the tip of the pen or stylus, an orientation of the pen or stylus by analyzing various properties of the image such as shape, aspect ratio, or orientation. In some embodiments that use multiple markers attached to the pen or stylus, the relative spatial positions of the marker images may be used to determine an orientation of the pen or stylus. For example, in some embodiments, three markers may be attached to the pen or stylus such that at least one of the markers resides at a substantially different z coordinate relative to the other two markers. Such use of three markers may permit detection of three positional and three orientational degrees of freedom of the pen or stylus.

While illustrated embodiments of the computing device 102 include the display 116, camera 104, one or more light sources 106, and keyboard 110 in a single assembly, in other embodiments, other arrangements may be used. For example, in some embodiments, one or more portions of the computing device 102 that are configured to facilitate determination of finger positions (such as the camera 104, light sources 106) may be included in a detachable assembly. This assembly may include other components, such as a platform on which to rest a user's hand and/or a wired or wireless connection to the computing device 102. In some embodiments, such a detachable assembly may include a trackpad and/or touch-sensitive surface which may be used, for example, for selection (i.e., mouse-clicking) or activation of the pointing mechanism.

Referring now to FIG. 3, a block diagram illustrating one or more components of a computing device 102 supporting touch-free interaction is illustrated in accordance with various embodiments. While particular modules are illustrated in FIG. 3 for the purpose of description, in various embodiments, the modules may be combined, separated into additional modules, and/or omitted entirely. In various embodiments, the computing device 102 may include an illumination control module 360. In various embodiments, the illumination control module 360 may be configured to selectively control illumination provided by the one or more light sources 106, as described herein. As such, in various embodiments, the illumination control module may be configured to control various aspects of illumination, including, but not limited to, time of illumination, duration of illumination, strobing, brightness, frequency of emitted light from one or more light sources 106, selection of which light source 106 to illuminate, selection of portions of light sources 106 which may be illuminated at a particular time, etc.

In various embodiments, the computing device 102 may also include a position determination module 380. In various embodiments, the position determination module 380 may be configured to recognize an image of one or more fingertips, such as image 210 of FIG. 2, out of an image captured by the camera 104, and to determine one or more positions for the recognized fingertips. In various embodiments, the position determination module 380 may be configured to determine position within the 3-D interaction region 108. In various embodiments, the position determination module may be configured to determine one or more positions in an x-y plane (i.e. without reference to a distance from the display 116, or to determine position within x-, y-, and z-axes. Particular embodiments of determining position of fingertips and other objects are described herein. The computing device 102 may also include an action performance module 390. In various embodiments, the action performance module 390 may be configured to perform gesture- or hand-position-recognition based on positions determined by the position determination module 380. The action performance module 390 may also be configured to determine one or more user-desired actions based on the recognized gestures or hand positions, and to control the computing device 102 (or another device) accordingly. Computing device 102 may comprise modules that may include programmable electronic processing circuitry (e.g., microcontrollers, microprocessors, FPGAs), programmed to execute their respective functions, dedicated logic circuitry designed to execute their respective functions (e.g., ASICs), or any combination thereof.

Figure 4:
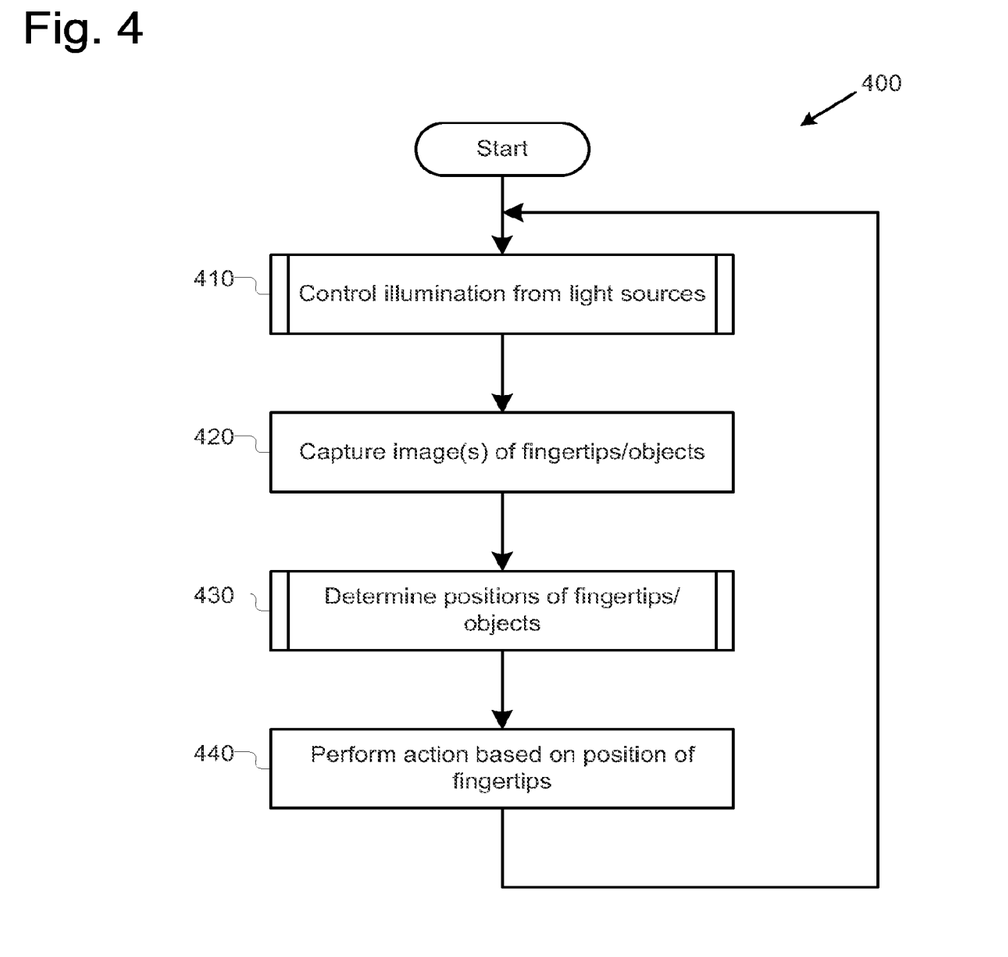
FIG. 4 illustrates an example process for recognizing human-computer interaction, in accordance with various embodiments.

FIG. 4 illustrates an example process 400 for recognizing human-computer interaction, in accordance with various embodiments. While FIG. 4 illustrates particular example operations for process 400, in various embodiments, process 400 may include additional operations, omit illustrated operations, and/or combine illustrated operations. In various embodiments, process 400 may be performed by one or more entities of the computing device 102. In various embodiments, process 400 may repeat one or more times, such that multiple positions of fingertips (or other objects) may be determined, such as for tracking purposes.

The process may begin at operation 410, where the computing device 102, and in particular the illumination control module 360, may control illumination produced by the one or more light sources 106. Particular examples of control of illumination are described below with reference to process 500 of FIG. 5. Next, at operation 420, the camera 104 may capture one or more images of fingertips. As discussed above, in various embodiments, the images captured by the camera 104 may be synchronized to be captured contemporaneously with illumination by the one or more light sources 104, such as when the illumination control module 360 strobes the light sources 104. In various embodiments, at operation 420, the camera 104 may capture filtered images, as described herein.

Next, at operation 430, the computing device 102, and in particular the position determination module 380, may determine one or more positions for fingertips (or other objects) whose images were captured by the camera 104. Particular examples of determination of positions are described below with reference to process 600 of FIG. 6.

Next, at operation 440, the computing device, and in particular the action performance module 390, may perform an action based on the position of the fingertips (or other objects). In various embodiments, these actions may be based on recognition of one or more hand positions, hand gestures, object positions, objects gestures, or other inputs made within the 3-D interaction region 108. In various embodiments, in addition to traditional mouse-based gestures, at operation 440 the action performance module may be configured to perform actions used with touch-based interfaces in which touch and gesture inputs have been integrated. For example, activities such as swiping, scrolling, and pinch-to-zoom may be facilitated.

Additionally, at operation 440, in addition to its use as an input device, the action performance module 390 may configured to measure biometric characteristics, such as finger (or hand) tremors, in a user. Such characteristics, which may be relatively unique to individuals, may be useful as security or authentication mechanisms by determining positions of all or part of the user's finger over a brief period of time (e.g., detection of specific jitter motion as a requirement to log in to a PC or to activate the cursor). In other embodiments, at operation 440, the action performance module 390 may be configured to utilize unique signature or fingerprint analysis, in conjunction with finger jitter, as biometric-based security measures.

After operation 440, the process may then repeat again at 410, such as, for example, to capture changes in positions of fingertips or other objects.

Figure 5:
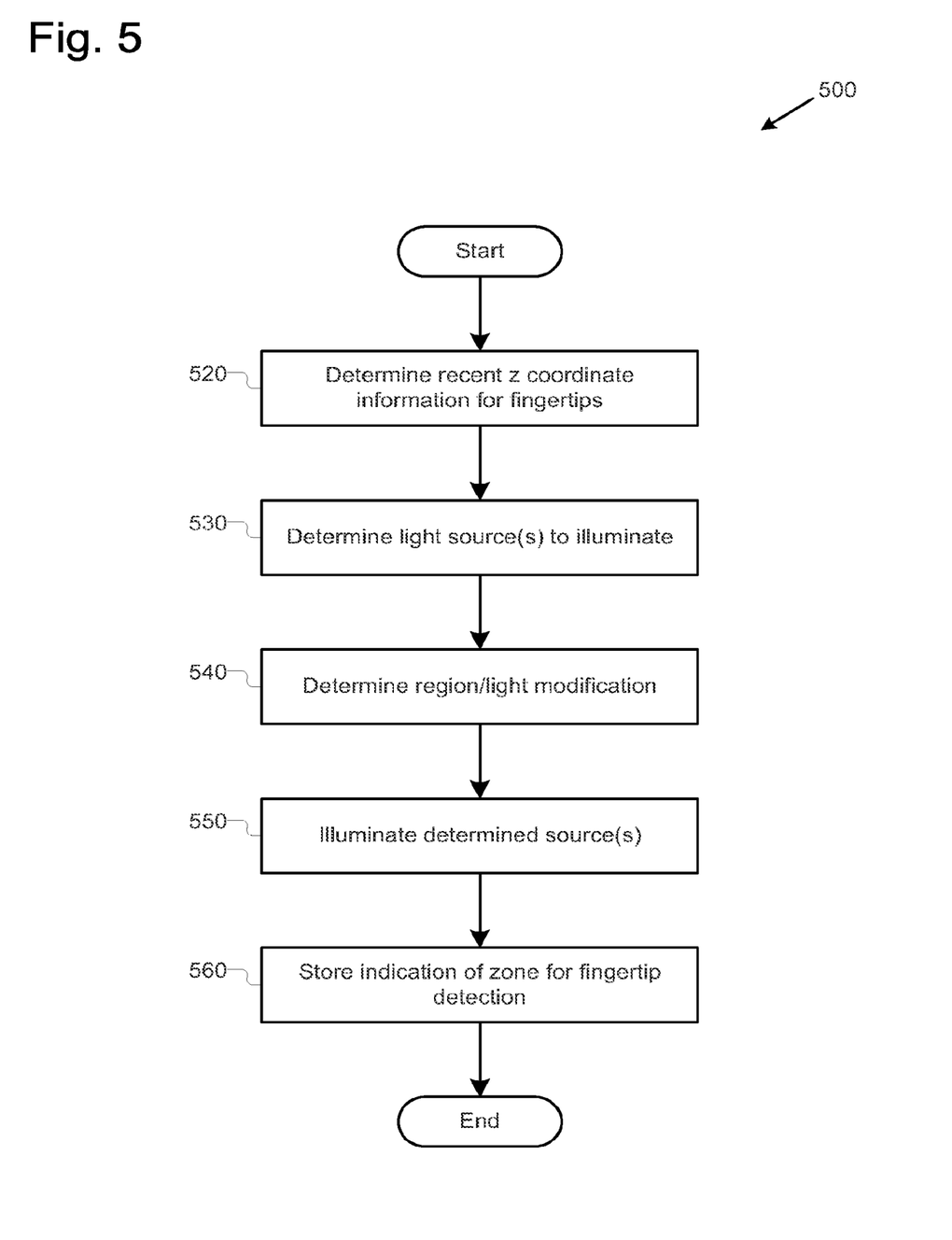
FIG. 5 illustrates an example process for control illumination for a device supporting human-computer interaction, in accordance with various embodiments.

FIG. 5 illustrates an example process for control illumination for a device supporting human-computer interaction, in accordance with various embodiments. Process 500 may include implementations of operation 410 of process 400 of FIG. 4. In various embodiments, through operation of process 500, the illumination control module 360 may determine which of the one or more light sources 106 should be selectively illuminated, as well as whether any particular regions of those light sources should be selectively illuminated and if any particular modifications should be made to the illumination before providing the actual illumination. While FIG. 5 illustrates particular example operations for process 500, in various embodiments, process 500 may include additional operations, omit illustrated operations, and/or combine illustrated operations. In various embodiments, process 500 may be performed by the illumination control module 360 of the computing device 102.

The process may begin at operation 520, where the illumination control module 360 may determine a recent x and/or z coordinate information for fingertips whose positions are being determined. In various embodiments, this may be a particular x and/or z coordinate determined by a previous performance of process 500. In other embodiments, the recent x and/or z coordinate information may be estimated based, for example, on a size of a fingertip image, position of a fingertip image, or other information.

Next at operation 530, the illumination control module 360 may determine which of the light sources 106 to illuminate next. In various embodiments this determination may be based on a sampling rate. Thus, the illumination control module 360 may, at operation 530, determine which light source or sources have not been illuminated within a time period determined according to the light source's sample rate and may select that source or sources. For example, if fingertips (or other objects) have been determined to be at a z-coordinate that is closer to the display 116, then a closer light source 106 may be illuminated at an increased rate, for increased time periods, and/or with increased brightness, and a farther light source may be illuminated at a decreased rate, for decreased time periods, and/or with decreased brightness. By contrast, if fingertips have been determined to be at a z-coordinate that is farther from the display 116, then a closer light source may be illuminated at a decreased rate, for decreased time periods, and/or with its brightness decreased, and/or a farther light source may be illuminated at an increased rate, for increased time periods, and/or with increased brightness. It may be noted that by increasing or decreasing rates of illumination by various light sources 106, rather than simply turning off the light sources entirely, the computing device 102 may be better configured to track fingertips as they enter closer areas, such as through synchronizing image capture by the camera 104 with illuminations of the light sources 106.

In other embodiments, the light sources 106 may be illuminated in concert with each other in order to provide more detailed information. For example, if multiple light sources 106 are used, z coordinate information may be determined based on the relative brightness or size of fingertip images. Thus, in some embodiments, light sources 106 may be not be turned on or off in exclusion of each other, and at operation 530, the illumination control module 360 may determine multiple light sources to illuminate.

Next, at operation 540, the illumination control module 360 may determine if any particular regions of the determined light source 106 are to be illuminated (such as when the computing device 102 is determining positions only in a particular region) or if other modifications, such as brightness, duration, or frequency modifications, are desired. Particular examples of such modifications are described above. Next, at operation 550, the illumination control module 360 may illuminate the determined light source or sources, subject to the modifications determined at operation 540. At operation 560, the illumination control module 360 may then store an indication of which light source or sources were illuminated, as well as any particular modifications that were performed. These indications may be used by the position determination module 380 to facilitate their functions. The process may then end.

Figure 6:
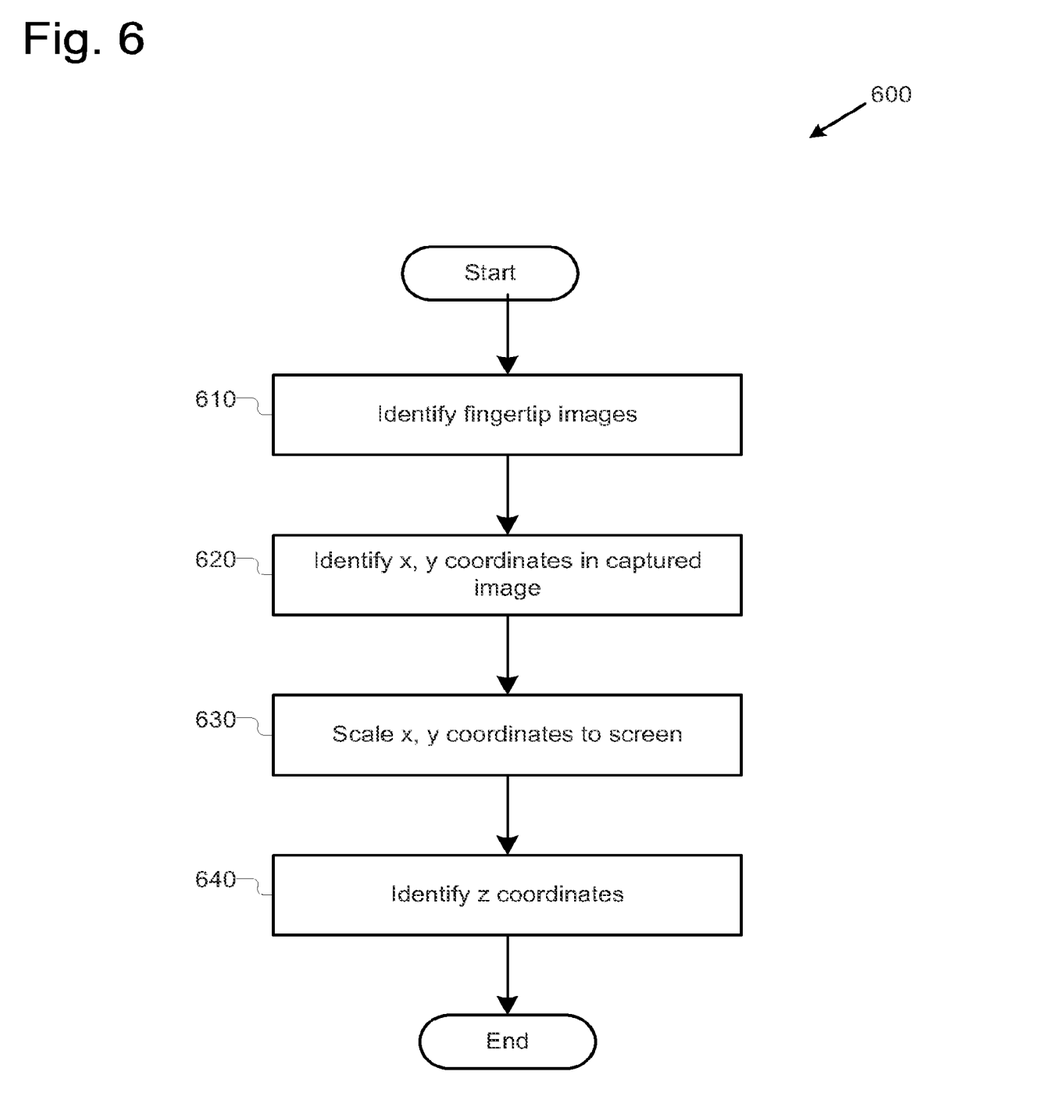
FIG. 6 illustrates an example process for identifying fingertip positions, in accordance with various embodiments.

FIG. 6 illustrates an example process for identifying fingertip positions, in accordance with various embodiments. Process 600 may include implementations of operation 430 of process 400 of FIG. 4. While FIG. 6 illustrates particular example operations for process 600, in various embodiments, process 600 may include additional operations, omit illustrated operations, and/or combine illustrated operations. In various embodiments, process 600 may be performed by the position determination module 380 of the computing device 102.

The process may begin at operation 610, where the position determination module 380 may identify fingertip (or other object) images in the image captured by the camera 104. In various embodiments, the position determination module 380 may identify fingertip images by identifying one or more high-brightness portions that are surrounded by lower brightness areas in the image captured by the camera 104. In various embodiments, these images may be assumed to be fingertips or other objects that are in the 3-D interaction region 108 because by virtue of being illuminated by the one or more light sources 106 and because background images may be largely assumed to be filtered out or otherwise omitted. The use of one or more threshold values may facilitate the discrimination of high-brightness and lower brightness portions of the image and thus improve fingertip detection. Thresholds may be constant within the image sensor 200 or may vary as a function of x, y coordinates within the sensor 200. For example, in some embodiments, a threshold that decreases in relation to the y coordinate may be employed, such that the size of the detected fingertip image may remain substantially constant as the user raises and lowers his/her finger within interaction region 108. Similar uses of variable thresholds in x and z (i.e., distance of the finger to the camera) may be employed.

Next, at operation 620, the position determination module 380 may identify x and y coordinates for the identified fingertip images. In particular, in various embodiments, the position determination module 380 may determine that the center of a high-brightness region identified at operation 610 may be used to represent the location of the fingertip images in the x-y plane. For example, referring back to FIG. 2, coordinates for the center point 215 of the fingertip image 210 may be identified as the coordinates for the fingertip image itself.

In various embodiments, different methods may be used to determine object center coordinates. For example, for a relatively smooth image or one in which there are found fewer high-brightness pixels. The "center" of the object may be assumed by the position determination module 380 to be the portion of the object which has a highest brightness pixel within the image of the object. However, in many cases, an image of an object may comprise many pixels and the image may not be smooth or symmetric.

In various embodiments, it may be desirable to use a more accurate measure of the object center by performing determination based on additional pixels in the image. In addition, in various embodiments, the position determination module 380 may be configured to identify a multiple-pixel center for an image. Such identification of a multiple-pixel center may permit sub-pixel resolution, enhanced accuracy, and increased robustness during coordinate identification and position determination. For example, in some embodiments, the position determination module 380 may be configured to measure the mean of the minimum and maximum x and y values of the image to achieve an approximate measure of the center of the image. In some embodiments, such a measure may be limited to 6 pixels; in other embodiments, other measures may be used.

In other embodiments, the position determination module 380 may be configured to perform a weighted average of image pixels for coordinate identification. In some embodiments, the position determination module 380 may weigh individual pixel coordinates by such factors as the number of illuminated pixels (e.g., span length per row) or an actual brightness value of each pixel. In some embodiments, resolution as small as a fraction of a pixel may be achievable by using sub-pixel interpolation. In other embodiments, the position determination module 380 may be configured to average coordinate values over multiple frames, such as by holding a buffer of past coordinate values and comparing those to presently-identified coordinates. Additionally, in various embodiments, the position determination module 380 may be configured to perform one or more filtering processes (e.g., Kalman, FIR, etc.) to the fingertip images prior to identification of coordinates. In alternative embodiments, other sensor and/or illumination parameters may be used instead of, or in addition to, threshold values to aid in fingertip detection. For example, the illumination brightness may be adjusted as the finger moves within the interaction region such that the size of the detected fingertip image remains substantially constant. Sensor gain and/or exposure values may be similarly used for the same purpose.

Next, at operation 620, the position determination module 380 may scale the identified x and y coordinates to a corresponding coordinate on the display, such as at which a cursor may be placed or some other function performed. In various embodiments, the position determination module 380 may be configured to scale the identified coordinates using a scaling factor and an offset for each coordinate dimension. In various embodiments, the position determination module 380 may be configured to determine scaling factors and offsets in a variety of ways depending on the type of interaction desired. For example, for a direct scaling from the sensor to the screen, x, y coordinates of the fingertip image may be directly mapped to a corresponding position on the screen. In alternative embodiments, screen positions may be mapped to a portion of a range of x or y coordinates such that the screen effectively resides within the bounds of the image sensor. In addition, the mapping of image to screen coordinates may not be constant versus x or y to account for relative tilt angles between interaction region 108 axes and the pointing axis of camera 113. The position determination module 380 may be configured to introduce offsets, if necessary, to compensate for alignment variations or changes between the camera's FOV and the illumination zone. For example, if the screen angle with respect to the keyboard is changed, an offset in the y-axis can be introduced to account for the new tilt angle of the screen.

In alternative embodiments, at operation 630 the position determination module 380 may be configured to perform a relative mapping between the identified x and y coordinates and coordinates on the screen that does not involve a simple scaling factor and offset. In such embodiments, the screen coordinate (at which a cursor might appear) may be based on relative movement of the fingertip (or other object) in the 3-D interaction region 108. In such embodiments, the screen cursor may move from its current location to a new one depending on the movement of the tracked object while active, but without the position determination module 380 utilizing a direct relationship between the respective coordinates at any given time.

Next, at operation 640, the position determination module 380 may be configured to determine a distance, or z coordinate for the fingertip image. In various embodiments, this determined coordinate may be used, such as by the action performance module 390, to perform a variety of input functions. For example, the z coordinate may indicate selection (e.g., mouse-clicking or drag/drop) of on-screen icons or menu items, basic navigation (e.g., zooming in/out), or other interactions that may benefit from finger movements along the z-axis. In some embodiments, at operation 630 the position determination module 380 may be configured to use an estimate of image size to determine the z coordinate as inversely related to the image size. In other embodiments, image brightness may be used instead of or in addition to image size.

In various embodiments, at operation 640 the z coordinate may optionally be determined through comparison of multiple images for the fingertip that were captured as illuminated by light sources 106 that are at different distances from the display 116. Thus, for example, if an image of a fingertip is found in a captured image illuminated by a first light source 106 but not by a second light source 106, then the position determination module 380 may determine that the z coordinate of the fingertip is between the locations of the two light sources 106. This determination of the position determination module 380 may be facilitated by indications recorded by the illumination control module 360, which may indicate, for a particular captured image, which light sources 106 were illuminated at the time the image was captured.

In some embodiments, the position determination module 380 may determine where this between location falls based on knowledge of a direction or of the light 114 that is emitted from each of the light sources 106. Thus, if the light is emitted in a conical cross section that increases in size as the y coordinate is increased, then the position determination module 380 may use knowledge of this light emission pattern to determine individual boundaries for the light 114 at different y coordinates, and to compute the z coordinate appropriately. After operation 640, the process may then end.

Figure 7:
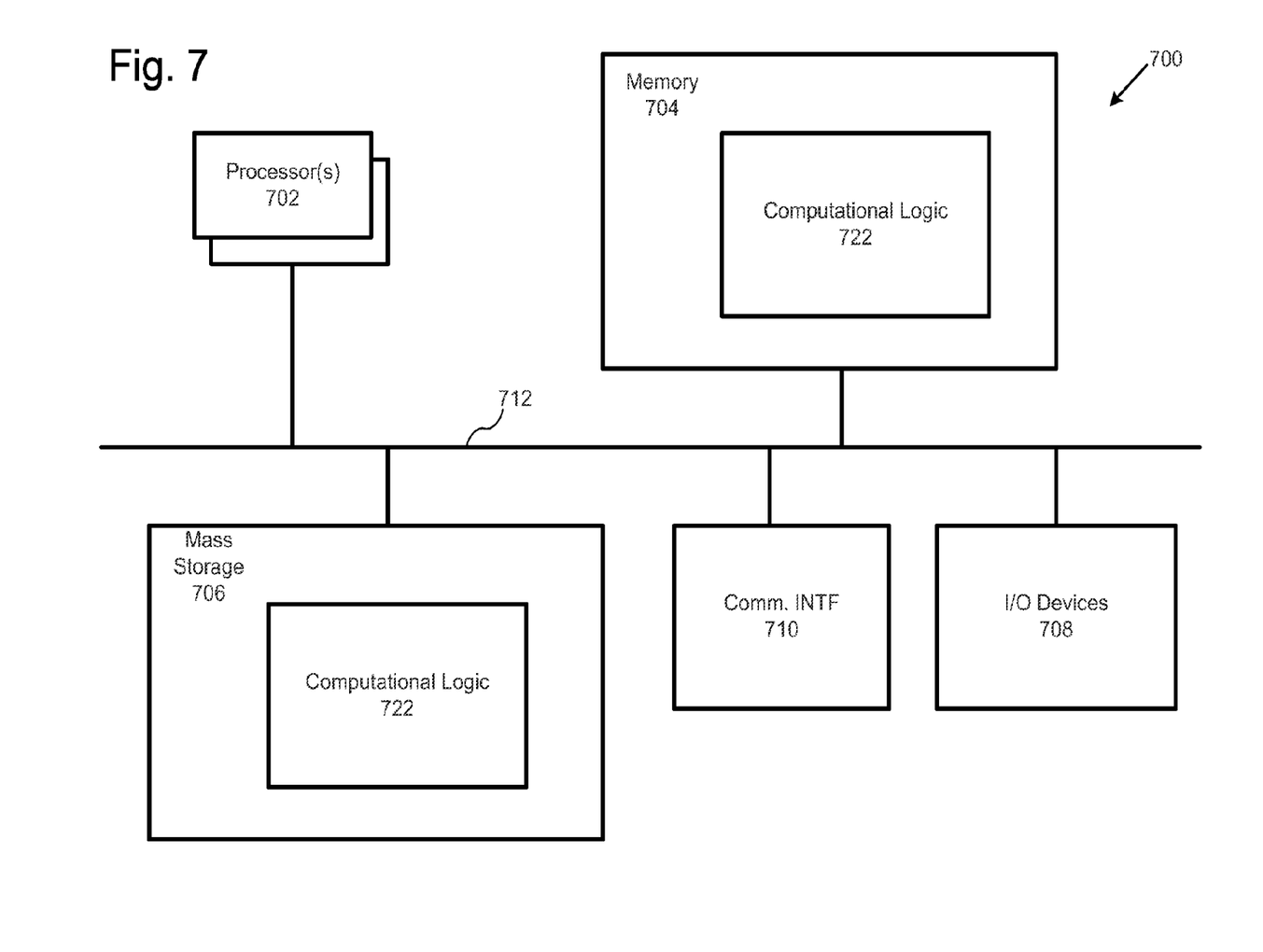
FIG. 7 illustrates an example computing environment suitable for practicing various aspects of the present disclosure, in accordance with various embodiments.

Referring now to FIG. 7, an example computer suitable for practicing various aspects of the present disclosure, including processes of FIGS. 4-6, is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with computing device 102, e.g., operations associated with fingertip position determination, collectively referred to as computing logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary. Their constitutions are otherwise known, and accordingly will not be further described.

Figure 8:
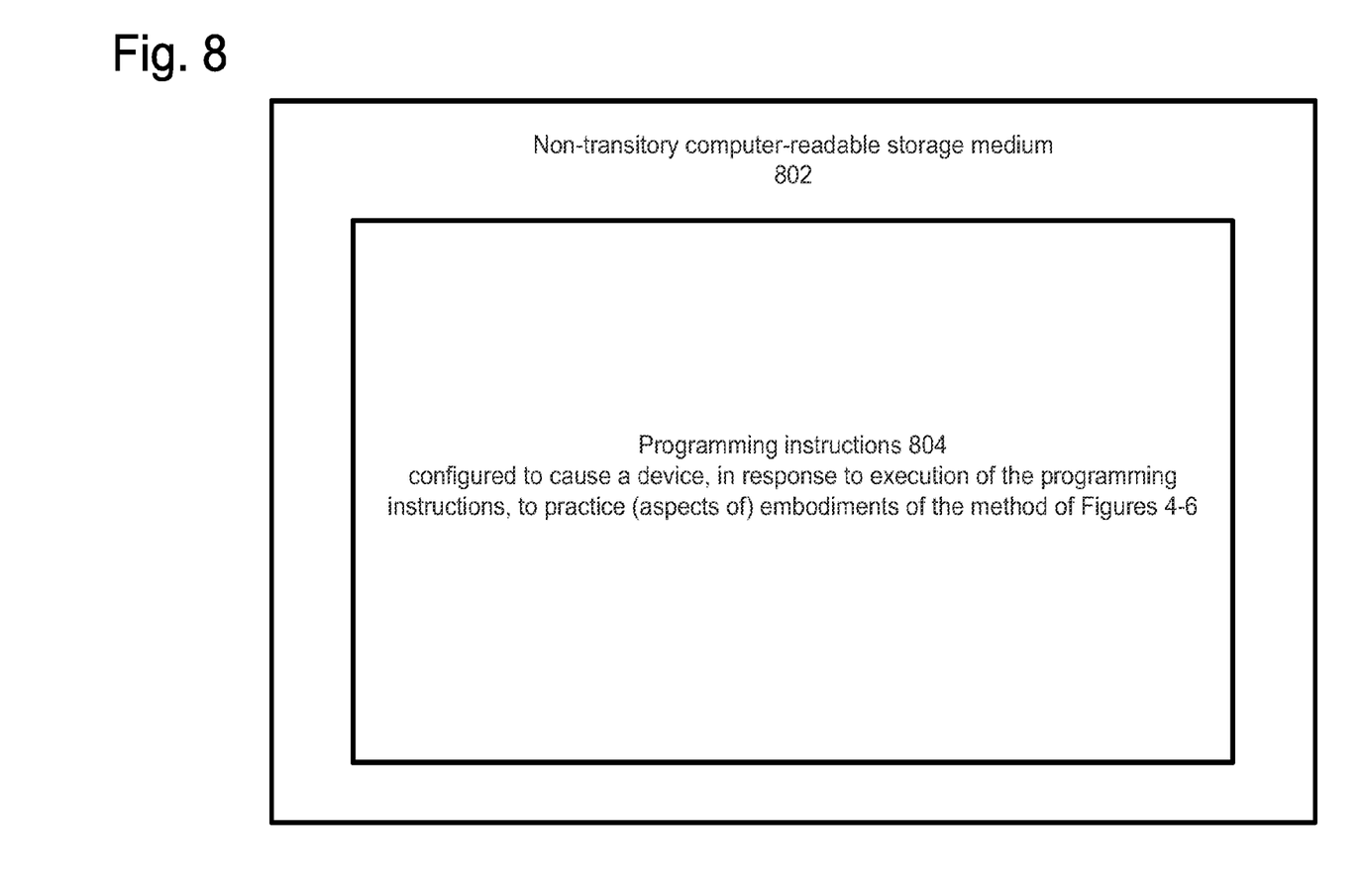
FIG. 8 illustrates an example storage medium with instructions configured to enable an apparatus to practice various aspects of the present disclosure, in accordance with various embodiments.

FIG. 8 illustrates an example least one computer-readable storage medium 802 having instructions configured to practice all or selected ones of the operations associated with computing device 102, e.g., operations associated with control of access to content, earlier described, in accordance with various embodiments. As illustrated, least one computer-readable storage medium 802 may include a number of programming instructions 804. Programming instructions 804 may be configured to enable a device, e.g., computer 700 and/or computing device 102, in response to execution of the programming instructions, to perform, e.g., various operations of processes of FIGS. 4-6, e.g., but not limited to, to the various operations performed to perform determination of frame alignments. In alternate embodiments, programming instructions 804 may be disposed on multiple least one computer-readable storage media 802 instead.

Referring back to FIG. 7, for one embodiment, at least one of processors 702 may be packaged together with memory having computational logic 722 configured to practice aspects of processes of FIGS. 4-6. For one embodiment, at least one of processors 702 may be packaged together with memory having computational logic 722 configured to practice aspects of processes of FIGS. 4-6 to form a System in Package (SiP). For one embodiment, at least one of processors 702 may be integrated on the same die with memory having computational logic 722 configured to practice aspects of processes of FIGS. 4-6. For one embodiment, at least one of processors 702 may be packaged together with memory having computational logic 722 configured to practice aspects of processes of FIGS. 4-6 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes n apparatus for supporting human-computer interaction The apparatus includes: a display, wherein the display defines a plane; one or more light sources to illuminate objects of a user placed in front of the display; a camera to capture one or more images of the illuminated objects, wherein the camera is to capture images in an image capture direction that is substantially normal to the plane of the display; and a position determination module coupled with the camera to determine, based on the captured images, one or more positions of the objects in a three-dimensional (3-D) interaction region defined in front of the display.

Example 2 includes the apparatus of example 1, wherein the light sources are to illuminate using light in a selected wavelength range and the camera includes a filter to substantially block light that is not in the selected wavelength range.

Example 3 includes the apparatus of example 2, wherein the selected wavelength range includes wavelength range of infrared light.

Example 4 includes the apparatus of example 1, wherein the light sources are disposed in the apparatus such that the light sources emit light in an illumination direction other than the image capture direction.

Example 5 includes the apparatus of example 4, wherein the illumination direction is a vertical direction.

Example 6 includes the apparatus of example 1, wherein the one or more light sources include a plurality of light sources located at different distances from the display.

Example 7 includes the apparatus of example 6, wherein the apparatus further includes a keyboard that includes a plurality of rows of keys and the one or more light sources are disposed between the rows of keys of the keyboard.

Example 8 includes the apparatus of example 6, further including an illumination control module coupled with the plurality of light sources and the camera to selectively operate individual light sources of the plurality of light sources to facilitate detection of objects positioned substantially along an axis defined by the image capture direction.

Example 9 includes the apparatus of example 8, wherein the camera is to capture images in synchronization with selective operation of individual light sources of the plurality of light sources.

Example 10 includes the apparatus of example 8, wherein the illumination control module is to selectively operate portions of the one or more light sources.

Example 11 includes the apparatus of example 6, wherein the position determination module is to determine positions of one or more objects substantially along an axis defined by the image capture direction based on one or images captured by the camera and synchronized with illumination of individual light sources of the plurality of light sources.

Example 12 includes the apparatus of example 1, wherein the apparatus includes one or more additional cameras to capture one or more images of the illuminated objects.

Example 13 includes the apparatus of example 12, wherein one or more of the additional cameras are to capture images in one or more image capture directions that are not substantially normal to the plane of the display.

Example 14 includes the apparatus of any one of examples 1-13, wherein the objects include a fingertip of the user.

Example 15 includes a method for supporting human-computer interaction with a computing device including a display defining a plane. The method includes: illuminating, by one or more light sources of the computing device, objects of a user placed in front of the display; capturing, by a camera of the computing device, one or more images of the illuminated objects in an image capture direction that is substantially normal to the plane of the display; and determining, by the computing device, based on the captured images, one or more positions of the objects in a three-dimensional (3-D) interaction region defined in front of the display.

Example 16 includes the method of example 15, wherein illuminating includes illuminating using light in a selected wavelength range and capturing one or more images includes capturing the one or more images using a filter to substantially block light that is not in the selected wavelength range.

Example 17 includes the method of example 16, wherein illuminating using light in a selected wavelength range includes illuminating using wavelength range of infrared light.

Example 18 includes the method of example 15, wherein illuminating includes emitting light in an illumination direction other than the image capture direction.

Example 19 includes the method of example 18, wherein the illuminating includes illuminating in a vertical direction.

Example 20 includes the method of example 15, wherein illuminating includes emitting light from the one or more light sources at different distances from the display.

Example 21 includes the method of example 20, wherein the computing device includes a keyboard that includes a plurality of rows of keys and emitting light from the one or more light sources at different distances from the display includes emitting light from the one or more light sources between the rows of keys of the keyboard.

Example 22 includes the method of example 20, wherein illuminating includes selectively operating individual light sources of the plurality of light sources to facilitate detection of objects positioned substantially along an axis defined by the image capture direction.

Example 23 includes the method of example 22, wherein capturing one or more images includes capturing images in synchronization with selective operation of individual light sources of the plurality of light sources.

Example 24 includes the method of example 22, wherein selectively operating individual light sources includes selectively operating portions of the one or more light sources.

Example 25 includes the method of example 20, wherein determining positions of one or more objects includes determining positions of one or more objects substantially along an axis defined by the image capture direction based on one or images captured by the camera and synchronized with illumination of individual light sources of the plurality of light sources.

Example 26 includes the method of example 15, wherein the capturing one or more images includes capturing one or more images using one or more additional cameras.

Example 27 includes the method of example 26, wherein capturing one or more images using the additional cameras includes capturing images in one or more image capture directions that are not substantially normal to the plane of the display.

Example 28 includes the method of any one of examples 15-27, wherein capturing one or more images includes capturing one or more images of a fingertip.

Example 29 includes one or more computer-readable media including computer-executable instructions configured, in response to execution on a computing device including a display that defines a plane, to cause the computing device to support human-computer interaction. The instructions cause the computing device to: illuminate objects of a user placed in front of the display; capture one or more images of the illuminated objects in an image capture direction that is substantially normal to the plane of the display; and determine based on the captured images, one or more positions of the objects in a three-dimensional (3-D) interaction region defined in front of the display.

Example 30 includes the computer-readable media of example 29, wherein illuminate includes illuminate using light in a selected wavelength range; and capture one or more images includes capture the one or more images using a filter to substantially block light that is not in the selected wavelength range.

Example 31 includes the computer-readable media of example 30, wherein illuminate using light in a selected wavelength range includes illuminate using wavelength range of infrared light.

Example 32 includes the computer-readable media of example 29, wherein illuminate includes emit light in an illumination direction other than the image capture direction.

Example 33 includes the computer-readable media of example 32, wherein the illuminate includes illuminate in a vertical direction.

Example 34 includes the computer-readable media of example 29, wherein illuminate includes emit light from the one or more light sources at different distances from the display.

Example 35 includes the computer-readable media of example 34, wherein the computing device includes a keyboard that includes a plurality of rows of keys and emit light from the one or more light sources at different distances from the display includes emit light from the one or more light sources between the rows of keys of the keyboard.

Example 36 includes the computer-readable media of example 34, wherein illuminate includes selectively operate individual light sources of the plurality of light sources to facilitate detection of objects positioned substantially along an axis defined by the image capture direction.

Example 37 includes the computer-readable media of example 36, wherein capture one or more images includes capture images in synchronization with selective operation of individual light sources of the plurality of light sources.

Example 38 includes the computer-readable media of example 36, wherein selectively operate individual light sources includes selectively operate portions of the one or more light sources.

Example 39 includes the computer-readable media of example 34, wherein determine positions of one or more objects includes determine positions of one or more objects substantially along an axis defined by the image capture direction based on one or images captured by the camera and synchronized with illumination of individual light sources of the plurality of light sources.

Example 40 includes the computer-readable media of example 29, wherein the capture one or more images includes capture one or more images using one or more additional cameras.

Example 41 includes the computer-readable media of example 40, wherein capture one or more images using the additional cameras includes capture images in one or more image capture directions that are not substantially normal to the plane of the display.

Example 42 includes the computer-readable media of any one of examples 29-41, wherein capturing one or more images includes capturing one or more images of a fingertip.

Example 43 includes an apparatus for supporting human-computer interaction with a computing device including display means defining a plane. The apparatus includes: means for illuminating objects of a user placed in front of the display; means for capturing one or more images of the illuminated objects in an image capture direction that is substantially normal to the plane of the display; and means for determining, based on the captured images, one or more positions of the objects in a three-dimensional (3-D) interaction region defined in front of the display means.

Example 44 includes the apparatus of example 43, wherein means for illuminating include means for illuminating using light in a selected wavelength range and means for capturing one or more images include means for capturing the one or more images using a filter to substantially block light that is not in the selected wavelength range.

Example 45 includes the apparatus of example 44, wherein means for illuminating using light in a selected wavelength range include means for illuminating using wavelength range of infrared light.

Example 46 includes the apparatus of example 43, wherein means for illuminating include means for emitting light in an illumination direction other than the image capture direction.

Example 47 includes the apparatus of example 46, wherein means for illuminating include means for illuminating in a vertical direction.

Example 48 includes the apparatus of example 43, wherein means for illuminating include means for emitting light at different distances from the display means.

Example 49 includes the apparatus of example 48, wherein the apparatus includes a keyboard that includes a plurality of rows of keys; and means for emitting light at different distances from the display means include means for emitting light between the rows of keys of the keyboard.

Example 50 includes the apparatus of example 48, wherein means for illuminating include a plurality of light source means and means for selectively operating the individual light source means of the plurality of light source means to facilitate detection of objects positioned substantially along an axis defined by the image capture direction.

Example 51 includes the apparatus of example 50, wherein means for capturing one or more images include means for capturing images in synchronization with selective operation of individual light source means of the plurality of light source means.

Example 52 includes the apparatus of example 50, wherein means for selectively operating individual light source means include means for selectively operating portions of the one or more light source means.

Example 53 includes the apparatus of example 50, wherein means for determining positions of one or more objects include means for determining positions of one or more objects substantially along an axis defined by the image capture direction based on one or images captured by the camera and synchronized with illumination of individual light source means of the plurality of light source means.

Example 54 includes the apparatus of example 53, wherein the means for capturing one or more images include means for capturing one or more images using one or more cameras.

Example 55 includes the apparatus of example 54, wherein means for capturing one or more images using the additional cameras include means for capturing images in one or more image capture directions that are not substantially normal to the plane of the display means.

Example 56 includes the apparatus of any one of examples 43-55, wherein means for capturing one or more images include means for capturing one or more images of a fingertip.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for supporting human-computer interaction, the apparatus comprising:
    a display, wherein the display defines a plane;
    one or more light sources located at different distances from the display to illuminate objects of a user placed in front of the display such that the illuminated objects can be detected by a camera located in the display;
    the camera, wherein the camera is to capture images of the illuminated objects in an image capture direction that is substantially normal to the plane of the display such that respective captured images are associated with different respective distances from the display;
    a position determination module coupled with the camera to determine, based on the captured images, one or more positions of the objects in a three-dimensional (3-D) interaction region defined in front of the display, wherein the position determination module is to determine distances of the objects based on the distances associated with the captured images;
    a keyboard that includes a plurality of keys, wherein the one or more light sources are disposed between the keys of the keyboard, wherein the light sources emit light in an illumination direction other than the image capture direction, and wherein the illumination direction is vertical; and
    an illumination control module coupled with the plurality of light sources and the camera to selectively operate individual light sources of the plurality of light sources to facilitate detection of objects positioned substantially along an axis defined by the image capture direction;
    wherein the camera is to capture images in synchronization with selective operation of individual light sources of the plurality of light sources.

2. The apparatus of claim 1, wherein:
    the one or more light sources are to illuminate using light in a selected wavelength range; and
    the camera comprises a filter to substantially block light that is not in the selected wavelength range.

3. The apparatus of claim 2, wherein the selected wavelength range comprises a wavelength range of infrared light.

4. The apparatus of claim 1, wherein the illumination control module is to selectively operate portions of the one or more light sources.

5. The apparatus of claim 1, wherein the position determination module is to determine positions of one or more objects substantially along an axis defined by the image capture direction based on synchronization of one or more images captured by the camera and illumination of individual light sources of the plurality of light sources.

6. The apparatus of claim 1, wherein the objects comprise a fingertip of the user.

7. A method for supporting human-computer interaction with a computing device comprising a display defining a plane and a keyboard having a plurality of keys, the method comprising:
    illuminating, by selectively operating individual light sources of one or more light sources of the computing device to facilitate detection of objects positioned substantially along an axis defined by an image capture direction, wherein the light sources are between the keys of the keyboard and emit light in a vertical illumination direction, and wherein objects of a user are placed in front of the display such that the illuminated objects can be detected by a camera of the computing device located at or near the display;
    capturing in synchronization with selective operation of individual light sources of the one or more light sources, by the camera of the computing device, one or more images of the illuminated objects in the image capture direction that is substantially normal to the display such that respective captured images are associated with different respective distances from the display; and
    determining, by the computing device, based on the captured images, one or more positions of the objects in a three-dimensional (3-D) interaction region defined in front of the display, including determining distances of the objects based on the distances associated with the captured images.

8. The method of claim 7, wherein:
illuminating comprises illuminating using light in a selected wavelength range; and
capturing one or more images comprises capturing the one or more images using a filter to substantially block light that is not in the selected wavelength range.

9. One or more non-transitory computer-readable media including computer-executable instructions configured, in response to execution on a computing device comprising a display that defines a plane and a keyboard having a plurality of keys, to cause the computing device to support human-computer interaction by causing the computing device to:
illuminate, by light sources of the computing device, wherein the light sources are between the keys of the keyboard and emit light in a vertical illumination direction, objects of a user placed in front of the display such that the illuminated objects can be detected by a camera of the computing device located in the display;
capture, by the camera of the computing device, one or more images of the illuminated objects in synchronization with illumination of individual light sources of the light sources in an image capture direction that is substantially normal to the display such that respective captured images are associated with different respective distances from the display; and
determine, based on the captured images, one or more positions of the objects in a three-dimensional (3-D) interaction region defined in front of the display, including determine distances of the objects based on the distances associated with the captured images.

10. An apparatus for supporting human-computer interaction, the apparatus comprising:
display means for displaying text and/or graphics to a user, the means for displaying text and/or graphics defining a plane;
keyboard means comprising a plurality of keys;
means for illuminating objects of a user placed in front of the display means at different distances from the display means such that the illuminated objects can be detected by means for capturing one or more images located at or near the display means, wherein means for illuminating objects comprises light sources between the keys of the keyboard means, wherein the light sources emit light in a vertical illumination direction;
the means for capturing one or more images, wherein the means for capturing one or more images comprises means for capturing one or more images of the illuminated objects in an image capture direction that is substantially normal to the display means such that respective captured images are associated with different respective distances from the display means; and
means for determining, based on the captured images, one or more positions of the objects in a three-dimensional (3-D) interaction region defined in front of the display means substantially along an axis defined by the image capture direction based on one or more images captured by a camera and synchronized with illumination of individual light sources of the light sources, wherein the determining includes determining distances of the objects based on the distances associated with the captured images.

* * * * *